United States Patent [19]

Guild

[11] 4,006,600
[45] Feb. 8, 1976

[54] TAPERED PILE TIPS

[76] Inventor: Charles L. Guild, 7 Stone Tower Land, Barrington, R.I. 02806

[22] Filed: Nov. 6, 1975

[21] Appl. No.: 629,508

[52] U.S. Cl. ........................................ 61/53; 61/56; 52/170
[51] Int. Cl.² .......................................... E02D 5/72
[58] Field of Search .............. 61/56, 56.5, 53, 53.5, 61/53.52, 53.64, 53.6, 53.7; 52/170; 175/19

[56] References Cited

UNITED STATES PATENTS

| | | | |
|---|---|---|---|
| 3,751,931 | 8/1973 | Merjan | 61/56 |
| 3,913,337 | 10/1975 | Merjan | 61/56 |

OTHER PUBLICATIONS

Construction Methods & Equip., May, 1957, pp. 218, 219, 221, 224.

*Primary Examiner*—Jacob Shapiro

[57] ABSTRACT

A tapered pile tip has a welded core assembly within its reinforced concrete body, the assembly having a tubular, mandrel-receiving core including a tubular member exposed at the larger end of the tip to which a length of corrugated tubing is to be welded and a member welded to the reinforcements of the body, one member including a seat engageable by the mandrel and a tubular portion receiving an end of the core.

6 Claims, 7 Drawing Figures

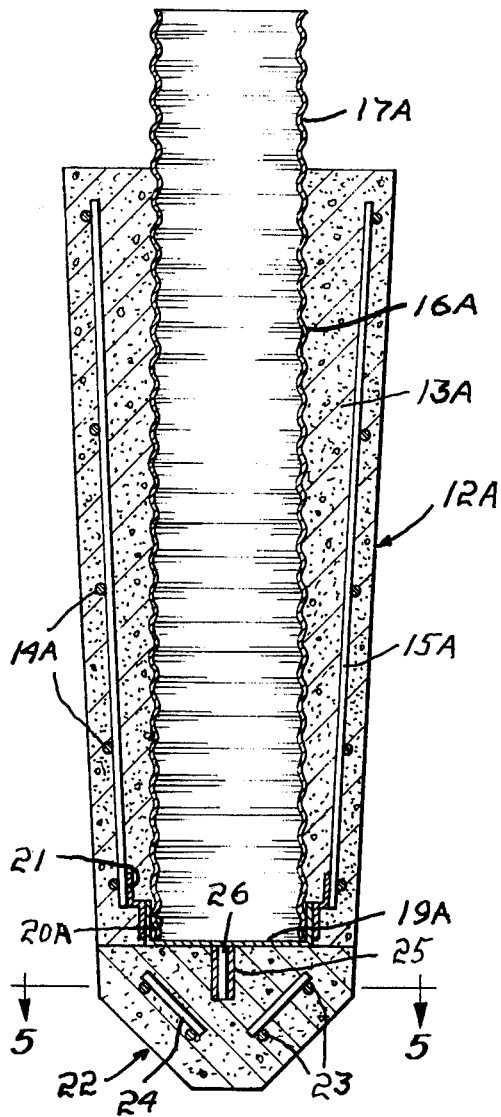
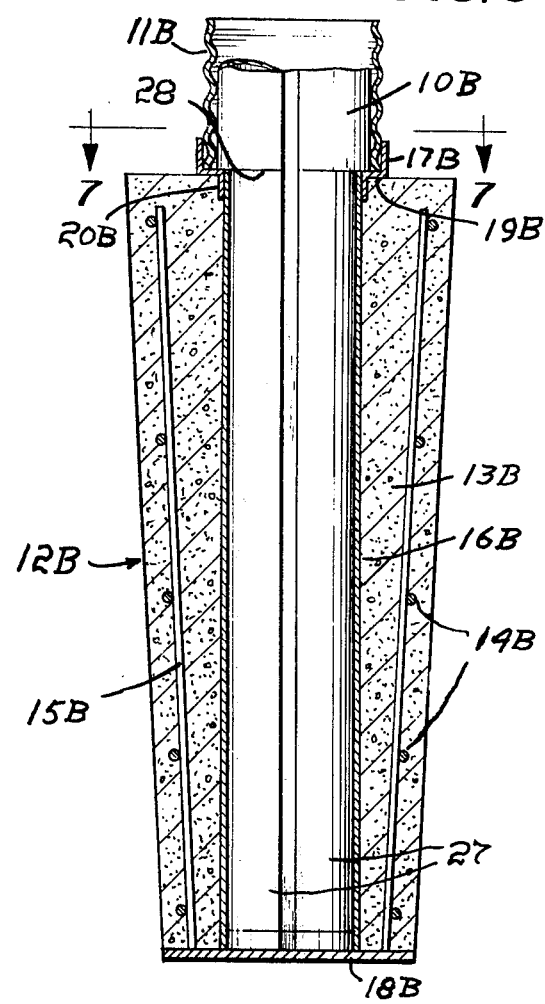
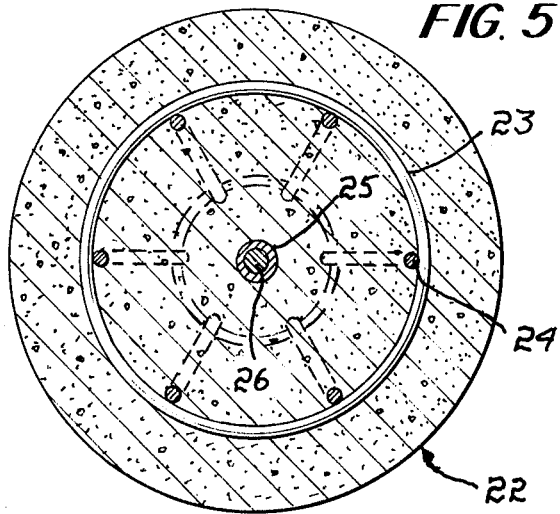
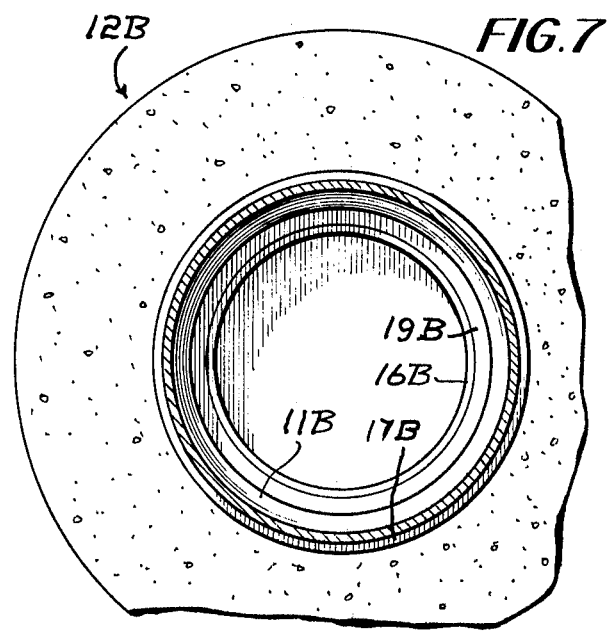

TAPERED PILE TIPS

BACKGROUND REFERENCES

"Construction Methods & Equipment," May 1957, Pages 218, 219, 221, 224.

"The Boston Sunday Globe," May 4, 1958. "MDC Road To Ease Charles Traffic."

"The Boston Sunday Globe," Feb. 21, 1957, "MDC Eliminating Memorial Drive Accident Producing Bottleneck."

U.S. Pat. No. 1,778,925.
U.S. Pat. No. 3,751,931.
U.S. Pat. No. 3,875,752.

BACKGROUND OF THE INVENTION

In the construction of the viaduct referred to in the publications listed above, tubular piles consisting of steel pipes were used that had tapered tips of reinforced concrete and that, after being driven were filled with concrete. Each tip had a length of steel pipe extending from its smaller, lower end through its larger end with a portion protruding centrally thereof to enable a pile-forming length of steel pipe to be welded thereto at the job site. A steel plate covered the smaller end of the tip and was welded to the steel pipe at that end and to the reinforcements of the concrete body.

Tubular piles of the corrugated type are widely used but these must be secured to a mandrel that can absorb, while being driven, hammer energy that would usually damage the pile if applied directly thereto. Such mandrels are expansible so that they may be inserted in or removed from the pile and in use they extend the full length of the piles and when expanded they so grip the piles that relative movement between them does not occur while being driven. In practice, the mandrels have boots at their earth entering ends and these are exposed at the corresponding ends of the piles. Desirably, the maximum gripping pressure applied by a mandrel is at the earth entering end of the pile secured thereto.

Tapered, reinforced concrete tips for tubular piles of corrugated tubing have also been successfully used. Such tips incorporated a length of corrugated tubing to provide a mandrel receiving socket within the concrete body with a portion protruding from the upper end of the tip to enable a wanted pile-forming length of like tubing to be welded thereto.

THE PRESENT INVENTION

The general objective of the present invention is to provide reinforced concrete, tapered pile tips that can be driven when an appropriate, pile-forming length of corrugated tubing is welded to its core, with the boot end of an expansible mandrel bottomed at or close to its smaller end, an objective attained with the tapered, reinforced concrete body having incorporated therein a welded core assembly including a tubular core extending through the concrete body from its larger upper end and including a tubular member protruding from the upper end of the body and dimensioned to enable a length of corrugated tubing to be welded thereto, a member at the lower end of the core and welded to the reinforcements of the concrete body and one of the members including a seat engageable by the mandrel and having a cylindrical portion receiving an end of the core.

Another objective of the invention is to provide such a pile tip in which the driving force is applied directly on the larger, upper end of the tip, an objective attained with the member exposed at that end including the mandrel seat and the cylindrical portion.

Another objective of the invention is to provide such a tip that minimizes the compaction of the subjacent soil, an objective attained by providing a blunt point of reinforced concrete with the tip and the point having means by which they are interconnected as the pile is driven.

BRIEF DESCRIPTION OF THE DRAWINGS

In the accompanying drawings, preferred embodiments of pile tips in accordance with the invention are illustrated

FIG. 4 is a view, similar to FIG. 2, illustrating a pile tip in accordance with another embodiment of the invention;

FIG. 5 is a section, on an increase in scale, taken approximately along the indicated line 5—5 of FIG. 4;

FIG. 6 is a view, similar to FIG. 4 illustrating a pile tip in accordance with another embodiment of the invention; and FIG. 7 is a section taken approximately along the line 7—7 of FIG. 6.

THE PREFERRED EMBODIMENT OF THE INVENTION

Figure 1:
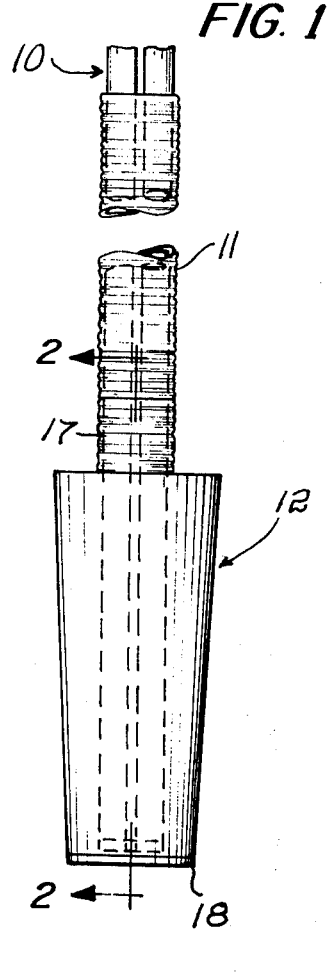
FIG. 1 is a side elevation of a tubular pile provided with a pile tip in accordance with the invention and secured on an expansible mandrel, the pile and the mandrel being broken away to foreshorten the drawing.
Figure 2:
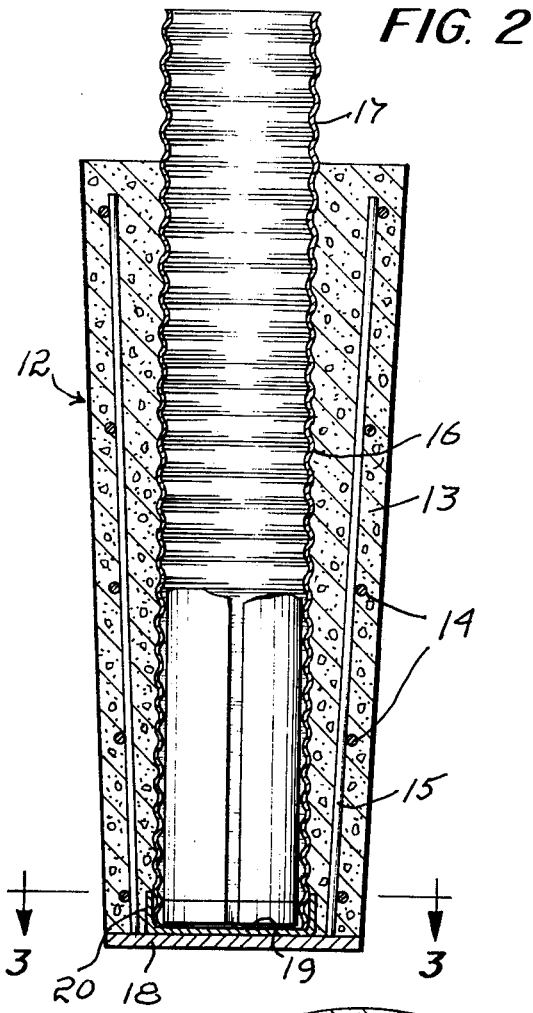
FIG. 2 is a section, on an increase in scale, taken approximately along the indicated line 2—2 of FIG. 1.
Figure 3:
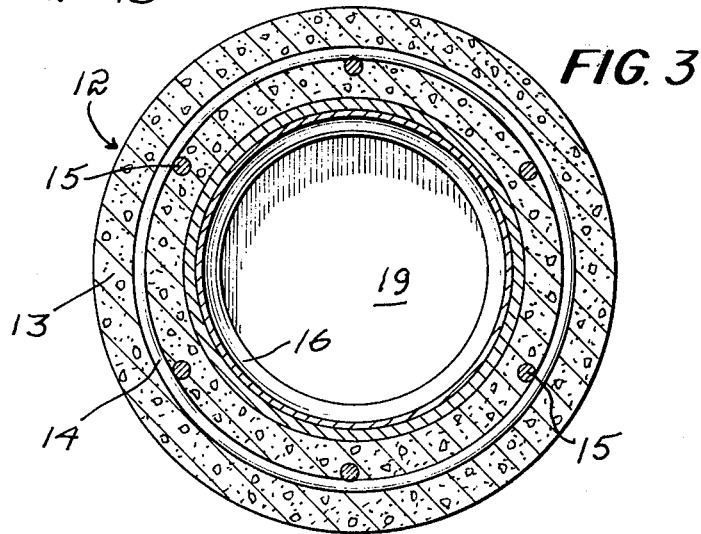
FIG. 3 is a section, on a further increase in scale, taken approximately along the indicated line 3—3 of FIG. 2.

In FIG. 1, an expansible mandrel, generally indicated at 10, is shown as extending through a tubular pile 11 and bottomed within a tapered, reinforced concrete pile tip, generally indicated at 12 and detailed in FIGS. 2 and 3.

The tip 12 has a concrete body 13 provided with circular reinforcements 14 welded to vertical reinforcements 15 and the tip may, by way of illustration and not by way of limitation, be of circular section, 5 feet in length with the diameter at its larger, upper end about 2 feet and so tapering that the diameter of its smaller, lower end is about 18 inches.

A welded core assembly is incorporated in the body 13 and includes a length of corrugated tubing 16 as its core, typically of the same type as the pile 11, extending from end-to-end of the concrete body 13 and having an end portion 17 protruding from the upper end thereof to which the pile 11 is welded.

The assembly includes a steel plate 18 covering the lower, smaller end of the body 13 and welded to the lower ends of the vertical reinforcements 15 and including a boot providing a seat 19 for the mandrel 10 and welded to the plate 11 and a tubular portion 20 receiving the lower end of the core 16 and welded thereto.

In FIGS. 4 and 5, there is shown another embodiment of the invention in which parts corresponding to those of the previously described embodiment are distinguished by the suffix addition A to the appropriate reference numerals.

The tip 12A differs from the tip 12 in that the vertical reinforcements 15A of the concrete body 13A terminate short of the smaller, lower end thereof and the plate 18 of the core assembly is omitted and the tubular portion 20A includes a somewhat larger tubular portion 21 welded to the lower ends of the reinforcements 15A.

The tip 12A includes a blunt point 22 of concrete with circular reinforcements 23 welded to inclined and upwardly disposed reinforcements 24 with the earth entering end of the tip 12A of an area substantially less than that of the cross sectional area of the tubing 16A and with its other end of the same area as that of the lower end of the tip 12A and having a central socket 25 dimensioned to receive the pin 26 welded to the seat 19A then enabling the tip 12A and the point 22 to be driven as a unit with the point 22 making it unnecessary to protect the smaller end of the tip with a plate such as the plate 18 of the tip 12 which plate is of substantial thickness.

In the embodiment of the invention illustrated by FIGS. 6 and 7 parts corresponding to those of the previously described embodiments are distinguished by the suffix addition B added to the appropriate reference numerals.

The tip 12B is for use with an expansible mandrel 10B having a tip-entering portion 27 of a smaller cross sectional area than the remainder thereof thus providing a mandrel shoulder 28 and differing from the previously described embodiments in that the plate 18B is welded directly to the lower end of the core 16B while the seat 19B, engageable by the mandrel shoulder, includes a tubular portion 17B to which a wanted length of pile forming corrugated stock is welded and a smaller tubular portion 20B receiving the upper end of the core 16B and welded thereto.

I claim:

1. A tip for attachment to a pile of the type consisting of at least one length of corrugated tubing and driven by means of an expansible mandrel having an end portion of a cross section less than that of the remainder of the mandrel and defining therewith a shoulder, said tip including a tapered, reinforced concrete body and a welded core assembly incorporated therein, said assembly consisting of a tubular core dimensioned to receive and be gripped by said mandrel and extending through the body from the larger upper end thereof and including a tubular member exposed at the upper end of the body and dimensioned to enable a length of said tubing to be welded thereto, a member welded to the reinforcement of the body and including a seat at the lower end of the tip engageable by the mandrel and a tubular portion receiving and welded to the lower end of the core, and a blunt point having at its upper portion of the size and shape of said lower tip end, said blunt point of an area less than the cross sectional area of the core and means detachably attaching the point to the tip.

2. The tip of claim 1 in which the connecting means includes a pin attached to the seat and a socket in the base of the blunt point.

3. A tip for attachment to a pile of the type consisting of at least one length of corrugated tubing and driven by means of an expansible mandrel, said tip including a tapered, concrete body and a welded reinforcing assembly and a tubular core incorporated therein, said tubular core dimensioned to receive and be gripped by said mandrel and extending through the body from the larger upper end thereof and including a tubular member exposed at said upper end and dimensioned to enable a length of said pile tubing to be secured thereto, and a seat engageable by the mandrel and exposed at the smaller end of the concrete body, said seat welded to the reinforcing assembly and to the core.

4. The tip of claim 3 in which the seat covers the smaller end of the concrete body.

5. The tip of claim 3 in which the seat includes a cap closing and welded to the lower end of the tubular core and an end plate welded to the reinforcing assembly.

6. The tip of claim 4 in which the plate covers the smaller end of the body.

* * * * *